3,019,123
PROCESS FOR IMPROVING THE SURFACE PROPERTIES OF POWDERS
Carl Boller, Giessen, Wolfgang Gündel, Dusseldorf-Oberkassel, and Alfred Kirstahler, Dusseldorf, Germany, assignors to Deutsche Hydrierwerke G.m.b.H., Dusseldorf, Germany
No Drawing. Filed May 26, 1959, Ser. No. 815,820
Claims priority, application Germany Nov. 21, 1952
3 Claims. (Cl. 106—308)

The present invention relates to a process for improving the surface properties of powdery materials, more particularly of such materials which are known as pigments and/or fillers. It is a continuation-in-part of our co-pending application Serial Number 393,486, filed Nov. 20, 1953, and now abandoned.

It has been found that these materials can be considerably improved by impregnation with mixtures of salts of acid organic derivatives of sulfuric acid, such as alkyl sulfates, alkyl sulfonates or alkyl benzene sulfonates, which contain as basic component, on the one hand, inorganic bases, for instance alkali metals, alkaline earth metals and earth metals, and, on the other hand, ammonium or organic bases.

By the afore-mentioned impregnation, the wettability of the powdery substances, as well as their dispersability in liquid, highly viscous, or plastic organic materials is markedly improved. Moreover, they are of high floating capacity when they are suspended in liquids and do not easily settle and, finally, they exhibit better adhesion and pouring properties.

These improved materials are particularly interesting for the paint and varnish industry due to their excellent floating properties or as fillers and pigments for natural or synthetic rubber, reclaim and rubber substitutes.

Powdery substances to be improved are predominantly inorganic, for instance: inorganic oxides, hydroxides and salts, as used as color pigments and fillers of which we mention, e.g., ocher, iron oxide red, minium, titanium dioxide, zinc sulfide, barium sulfate, calcium carbonate, etc.; furthermore, carbon black, zinc oxide, finely dispersed silicic anhydride, silica gel, calcium silicate, aluminum silicate dispersions, and the like, used as fillers for coatings and for rubber and rubber reclaim.

Also, we should like to mention inorganic powder bases, such as talc, bleaching earths, kaolin, pumice powder, alumina, activated carbon and similar inorganic powdery substances.

In U.S. Patent 2,637,711 water dispersions of organic pigments have been described which employ as dispersants similar agents as used according to the present invention. However, that patent relates to organic pigments, such as phthalocyanine blues and greens, benzidine yellows, indigoid and anthraquinone type vat pigments and others, which are to be incorporated in latex compositions and similar water-based coatings as aqueous slurries and dispersions.

The present invention, in contrast thereto, relates to dry pigments and fillers of inorganic nature, to be incorporated in oleo-resinous and synthetic varnishes, e.g., lacquers, and other water-immiscible polymeric compounds. Whereas the pigments during impregnation are treated with aqueous dispersions, according to one embodiment, the water is removed after the treatment by drying of the fillers and pigments so that dry compounds are added to the vehicles.

The impregnation of these powdery substances with the mixtures of salts of acid organic sulfuric acid derivatives is done in the usual manner, by stirring the powders into solutions of the salt mixtures in water or in an organic solvent, separating, and drying, or by spraying or atomizing the solutions onto the dry pigments, or the like.

In some cases, the salt mixtures may directly be applied to the powdery substances by grinding or milling them together; the components may, in these cases, be either both dry or wet. The amounts of sulfuric acid derivatives to be applied to the powders depend on the working conditions and the particular use. The amounts range from 0.05–10% and more, especially from 0.1–5%, calculated on the weight of the powdery substances.

By organic derivatives of sulfuric acid to be used for the mixtures of salts according to the present invention, we mean first of all acid sulfuric acid esters of aliphatic, cycloaliphatic, and alkylaromatic alcohols, and sulfonic acids having their sulfo groups linked to aliphatic or aromatic radicals.

The following examples are given of the derivatives in question:

The sulfuric acid esters of hexyl, octyl, dodecyl, or oleyl alcohols, or mixtures of alkylsulfuric acid esters, the sulfuric acid esters of naphthenic or rosin alcohols, hexyl sulfonic acid, cyclohexyl sulfonic acid, octyl sulfonic acid, mixtures of alkyl sulfonic acids, as obtained by reacting hydrocarbon mixtures, for instance diesel oil, with sulfur dioxide or chlorine. Furthermore, octylbenzene sulfonic acid, dodecyl benzene sulfonic acid, or other alkylbenzene sulfonic acids or mixtures thereof, obtained, e.g., by condensation of halogenated benzine hydrocarbons with benzene in the presence of aluminum chloride and subsequent sulfonation; moreover, tetrahydronaphthalene sulfonic acid and the like.

The alkyl radicals of the sulfuric acid derivatives may also contain heteroatoms, e.g., oxygen, sulfur, or nitrogen, or atom groups derived therefrom, or may contain substituents. Inorganic bases used for forming the salt mixtures according to the invention are, among others, those of sodium, potassium, calcium, magnesium, aluminum, etc. Organic bases are primary, secondary or tertiary bases, such as octylamine, dioctylamine, cyclohexylamine, diethylcyclohexylamine, monomethylaniline, diethylaniline, monoethanolamine, diethanolamine, triethanolamine, morpholine, piperidine, pyridine, quinoline and the like.

Impregnation of the powdery substances, pigments or fillers renders them useful in many fields of application. Apart from the above mentioned paint and varnish industries and their use in the rubber industry, they may, for instance, be employed in admixing powdery opacifiers, pigments and fillers in the plastics and related industries. They may be used as powders in dusting rubber or plastic sheets, in the production of pigment-containing coatings for paper and cardboard, as dulling agent for synthetic fiber and shaped articles, as filling, weighting and sizing agents in the textile industry, and so on.

Another salient feature of the present invention resides in obviating thioxotropic effects. When pigments and fillers are incorporated in oleo-resinous varnishes, thereby producing paints and enamels, or by incorporation in other high-polymeric vehicles, such as lacquers, a thixotropic effect ensues which, in the course of time, e.g., several days to several weeks, thickens the paint, enamel or similar coating compound into a rubbery gel which is useless. This effect is known as "livering." Livered compounds usually cannot be returned into the fluid state, and if they can be so returned, e.g., by addition of an acid, the additive interferes with the drying and other properties of the compounds. The pigments and fillers impregnated with triethanolamine salts and magnesium salts of alkylsulfates according to the present invention do not promote any thixotropic effect. Aside from livering, sometimes merely a thickening of the coating compound is observed which, though not as severe as livering, still interferes with the application of the compound and requires additional solvent. Even a slight thickening is prevented by the use of pigments and fillers treated according to the present invention. If, however, only either one of the above-named components is used, livering is actually promoted instead of being prevented.

The impregnating process according to the present invention is applicable in all instances which require the improvement of the surface properties of the powdery substances, of increasing their covering or filling capacity, enhancing their stability in a dispersed state, i.e., preventing the settling of the pigments and fillers, and improving the properties of the products made therewith during use.

The process according to the invention will now be more fully described in a number of Examples, but it should be understood that these are given merely by way of illustration, not of limitation, and that many changes in the details may be made without departing from the spirit and the scope of the invention, as hereinafter claimed.

The parts given in the following examples are by weight.

Example 1

500 parts of iron oxide red are ground in a ball mill with 5 parts of a sulfonate mixture comprising 20% of the diethylcyclohexylamino salts of an alkylsulfate mixture having alkyl radicals $C_4$–$C_{11}$ and 80% of the magnesium salts of an alkylsulfate mixture having alkyl radicals $C_{10}$–$C_{18}$, until a homogeneous dispersion of the mixture on the iron oxide red is obtained. The iron oxide does not change color; it is stable in storage and can easily and homogeneously be incorporated in paints and varnishes.

The pigment may be ground with a rosin ester linseed oil varnish (1:1) in the ratio of 50 parts of pigment to 50 parts of varnish in a ball or pebble mill. The ground preparation substantially does not settle within 6 months; at the utmost, there is a very slight increase in pigment below the upper third in the container. A homogeneous redispersion may easily be obtained. Sedimentation measured according to the method of Boller-Lichthardt (Farbe und Lack 58, pp. 441–443) was so slight that the test cone reached the bottom of the container with the weight of only 9 grams.

A comparison test with a preparation containing the same binder and the same iron oxide red used in the same ratio, but which had not been so impregnated, exhibited, after 6 months, a heavy viscous sediment which was difficult to stir in again. In testing this preparation according to the above testing method, a cone weight of 150 grams had to be used in order to reach the bottom of the container.

Example 2

In a pug mill, 500 parts of iron oxide red were ground with 5 parts of a solution containing 10% diethylcyclohexylamino salt of an alkylsulfate mixture with alkyl radicals $C_4$–$C_{11}$, 40% magnesium salt of an alkylsulfate mixture with alkyl radicals $C_{10}$–$C_{18}$, 40% water and 10% hexaline.

The grinding was continued until a uniform dispersion of the alkylsulfate salt mixture had occurred and the water had evaporated. The iron oxide red did not change its color and had an excellent dispersing and floating capacity in varnishes.

When tested in resin ester linseed oil varnish (1:1), ground at a ratio of 50:50 by the method given in Example 1, the cone weight for reaching the bottom was 21 g.; with untreated pigment 150 g.

Instead of using the sulfuric acid derivatives as given in Examples 1 and 2, any of the following can be used: the sulfuric acid esters of hexyl, octyl, dodecyl, or oleyl alcohols, or mixtures of alkylsulfuric acid esters, the sulfuric acid esters of naphthenic or resin alcohols, hexyl sulfonic acid, cyclohexyl sulfonic acid, octyl sulfonic acid, mixtures of alkyl sulfonic acids, such as obtained by reacting hydrocarbon mixtures, for instance diesel oil, with sulfur dioxide or chlorine. Furthermore, octylbenzene sulfonic acid, dodecyl benzene sulfonic acid, or other alkylbenzene sulfonic acids or mixtures thereof, obtained e.g., by condensation of unsaturated benzine hydrocarbons with benzene in the presence of aluminum chloride and subsequent sulfonation; moreover, tetrahydronaphthalene sulfonic acid and the like alkylbenzene sulfonates as likewise listed.

Finally, instead of using as organic bases the diethylcyclohexyl amines, we may use octylamines, dioctylamines, alkylsubstitutes anilines, monoethanol- or triethanol amines, and heterocyclic bases; instead of magnesium we may use as inorganic salt-forming elements, sodium, potassium, aluminum, and the like.

Example 3

For improving the surface properties of a calcium silicate to be used as filler in the rubber industry, to 1,000 parts by weight of a paste containing 30% calcium silicate and 70% water, 12 parts by weight of a mixture are added consisting of the magnesium salt of an alkyl benzene sulfonic acid mixture (alkyl radicals of $C_{12}$–$C_{16}$) and the corresponding triethanol amine salt, at a ratio of 1:1.

The mixture is homogenized in a kneading machine, is dried at about 100° C. in the usual manner and then is milled.

Instead of the calcium silicate one may use, in a similar manner, a silica gel obtained by precipitating an aqueous sodium silicate solution with a mineral acid.

Example 4

100 parts by weight finely powdered ochre are sprayed with 10 g. of an aqueous solution as described in Example 1 while uniformly stirred and mixed. The pigment then is dried in the usual manner. This pigment can be used in paints and enamels, as described in the preceding examples, and exhibits excellent floating properties. Paints and enamels containing this pigment do not liver nor do they show any lesser thixotropic tendencies.

Example 5

An undried filter cake containing 1,000 parts by weight barium sulfate is treated on the filter with a solution containing 10 parts each by weight of the diethanolamine salt and of the magnesium salt of the acid dodecylsulfuric acid ester. This solution is added gradually whereby a good resorption of the floating agent takes place. The pigment thus treated is dried first by continuing the filtration and then in the usual manner.

This barium sulfate can be used as white pigment in lacquers which contain the commonly used film formers, e.g., nitrocellulose, etc., a commercial solvent mixture, e.g., toluene benzene and acetic ester. The pigment content may be as high as 50 to 75 percent without settling.

We claim:

1. A process for the improvement of the wetting and floating properties of inorganic powdery substances which are substantially insoluble in water and in organic solvents, which are capable of absorbing a mixture of salts with which they are to be treated, which comprises grinding said powdery substances in the presence of water to form a paste with a mixture of salts from acid derivatives of sulfuric acid, said mixture containing a salt of said acid derivative component with a first base and a salt of said acid derivative component with a second base in proportions of 1:1 to 4:1 by weight, wherein said sulfuric acid derivative is selected from the group consisting of alkyl sulfates, alkyl sulfonates, and alkyl benzene sulfonates, each alkyl group containing from 4 to 18 carbon atoms, and wherein the components of the first base are selected from the group consisting of alkali metals, alkaline earth metals, and earth metals, and wherein the components for the second base are selected from the group consisting of ammonia and organic bases, and wherein said salt mixture is present in an amount of 0.05–10 percent by weight of the total mixture, and grinding is continued until the water evaporates and a homogeneous dry powder product is obtained, which is dispersible in organic solvents.

2. A process for the improvement of the wetting, dispersing and floating properties of inorganic substantially water-insoluble pigments and fillers in water-immiscible oleo-resinous and synthetic paints, enamels and lacquers and for the prevention of thixotropy of said paints, enamels and lacquers, which comprises impregnating said pigments and fillers by grinding them together with a mixture of salts from acid derivatives of sulfuric acid with a first and a second base in proportions of 1:1 to 4:1 by weight, wherein said sulfuric acid derivative component is selected from the group consisting of alkyl sulfates, alkyl sulfonates, and alkyl benzene sulfonates, each alkyl radical containing from 4 to 18 carbon atoms, and wherein the component of said first base is selected from the group consisting of alkali metals, alkaline earth metals, and earth metals, and wherein the component for the second base is selected from the group consisting of ammonia and organic bases, and wherein said mixture of salts is present in an amount of 0.05–10 percent by weight of the total mixture, and grinding is continued until a homogeneous dry product is obtained, before incorporation of said pigments and fillers in said paints, enamels and lacquers.

3. A process for the improvement of the wetting and dispersing properties of inorganic substantially water-insoluble fillers and pigments in natural and synthetic rubbers, which comprises impregnating said fillers and pigments by grinding them together with a mixture of salts from acid derivatives of sulfuric acid with a first and a second base in proportions of 1:1 to 4:1 by weight, wherein said sulfuric acid derivative component is selected from the group consisting of alkyl sulfates, alkyl sulfonates and alkyl benzene sulfonates, each alkyl radical containing from 4 to 18 carbon atoms, and the components of said first base are selected from the group consisting of alkali metals, alkaline earth metals, and earth metals, and the components of said second base are selected from the group consisting of ammonia and organic bases, and wherein said mixture of salts is present in an amount of 0.05–10 percent by weight of the total mixture, and grinding is continued until a homogeneous dry product is obtained, before incorporation of said fillers and pigments in said rubbers.

References Cited in the file of this patent

UNITED STATES PATENTS

| | | |
|---|---|---|
| 2,637,711 | Auer | May 5, 1953 |
| 2,719,010 | Erickson | Sept. 27, 1955 |
| 2,809,122 | Willis et al. | Oct. 8, 1957 |